C. W. O'DONNELL.
TRANSMISSION GEARING.
APPLICATION FILED JUNE 22, 1915. RENEWED FEB. 7, 1916.

1,197,535.

Patented Sept. 5, 1916.
2 SHEETS—SHEET 1.

Witnesses
C. F. Rudolph
P. M. Smith

Inventor
C. W. O'Donnell,
By Victor J. Evans
Attorney

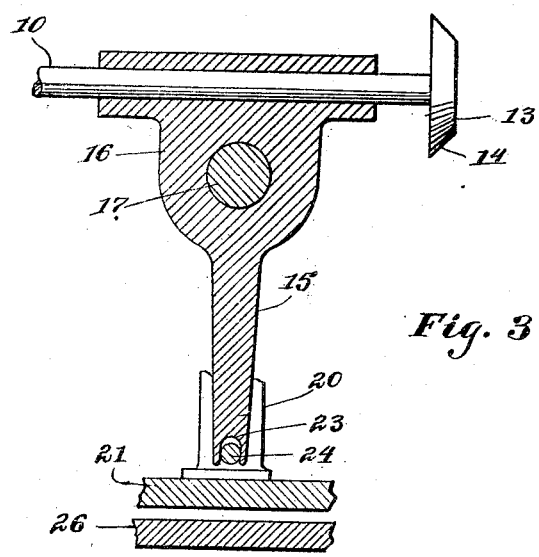
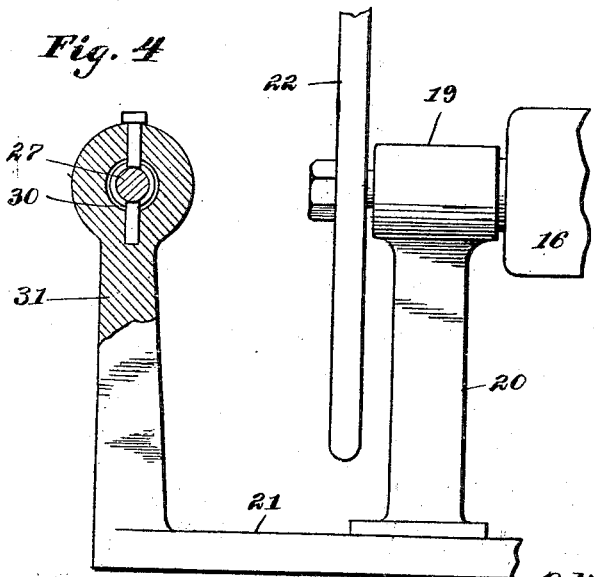

UNITED STATES PATENT OFFICE.

CLARENCE W. O'DONNELL, OF RACINE, WISCONSIN.

TRANSMISSION-GEARING.

1,197,535. Specification of Letters Patent. Patented Sept. 5, 1916.

Application filed June 22, 1915, Serial No. 35,620. Renewed February 7, 1916. Serial No. 76,776.

*To all whom it may concern:*

Be it known that I, CLARENCE W. O'DONNELL, a citizen of the United States, residing at Racine, in the county of Racine and State of Wisconsin, have invented new and useful Improvements in Transmission-Gearing, of which the following is a specification.

This invention relates to transmission gearing, the object in view being to produce gearing of the class described of novel construction and embodying a novel combination and relation of elements whereby the ratio of speed between the driving and driven members may be varied to suit varying requirements, the mechanism hereinafter described further providing for breaking the driving connection between the driving and driven members of the vehicle.

With the above and other objects in view, the invention consists in the novel construction, combination and arrangement of parts, as herein described, illustrated and claimed.

Figure 1:
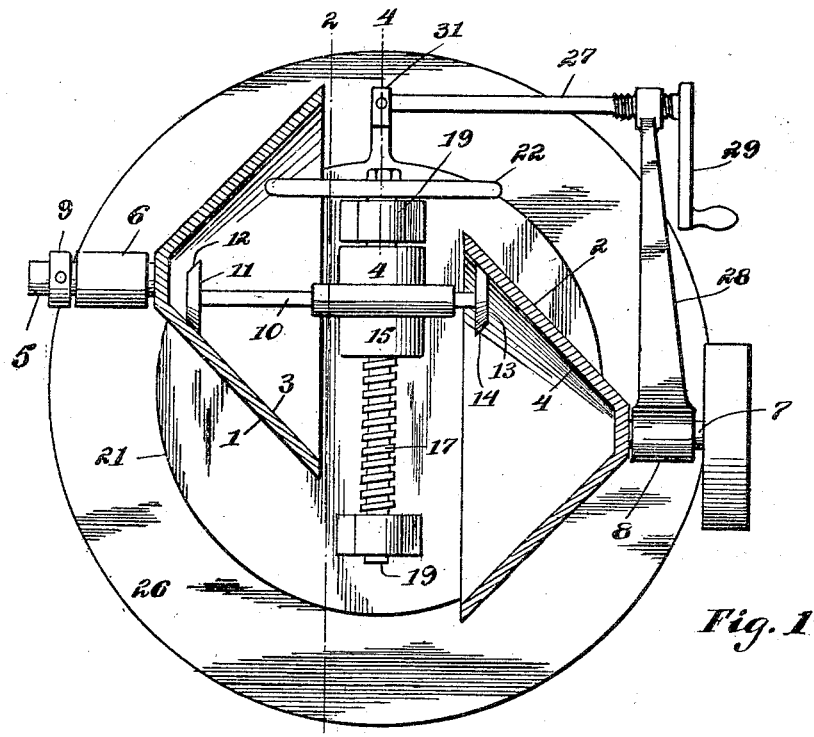
Figure 2:
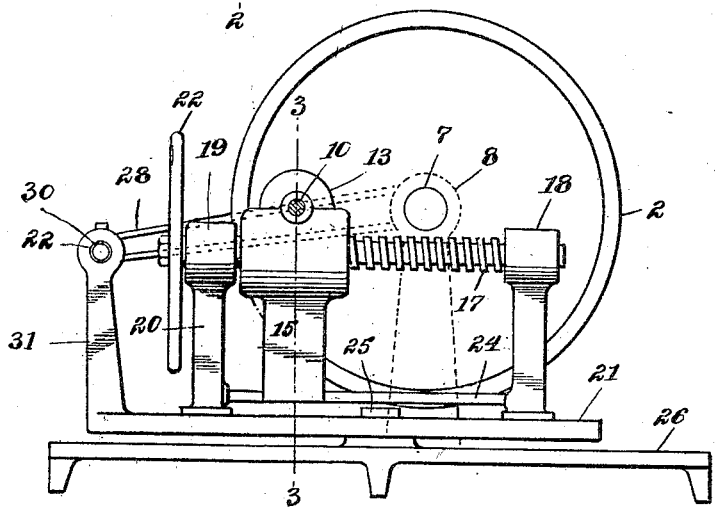

In the accompanying drawings:—Figure 1 is a view partly in elevation and partly in section illustrating the transmission gearing of this invention. Fig. 2 is a view taken at right angles to Fig. 1 in a line parallel to and at one side of the runner and its feed screw. Fig. 3 is a section on the line 3—3 of Fig. 2. Fig. 4 is a section on the line 4—4 of Fig. 1.

The driving member is indicated at 1 and the driven member at 2. Each of said members, in the preferred embodiment of this invention, is in the form of a hollow cone, the driving member 1 having a cone-shaped or beveled internal working face 3 and the member 2 having a corresponding cone-shaped or beveled internal working face 4. The member 1 is shown as mounted on a driving shaft 5 journaled in a bearing 6 and the member 2 is shown as mounted on a driven shaft 7 journaled in a bearing 8.

9 designates collars to prevent end thrust of the shafts 5 and 7.

By reference to Fig. 1 it will be observed that the larger ends of the members 1 and 2 or those sides thereof which are of greatest diameter are disposed in parallel and spaced relation to each other and it will also be observed that the axes of said members are offset from each other, the shafts 5 and 7 being out of longitudinal alinement with each other.

In order to transmit motion from the driving member 1 to the driven member 2, a transmission shaft 10 is employed, said shaft having fast on one end thereof a pinion 11 having a conical or beveled working face 12, said shaft having fast on the other end thereof a pinion 13 having a conical or beveled working face 14. The working faces of the pinions 11 and 13 are adapted to coöperate directly with the respective working faces 3 and 4 of the driving and driven members 1 and 2.

15 designates a runner provided with a bearing 16 in which the transmission shaft 10 is journaled and through which said shaft is slidable in the direction of its length. Means for shifting the runner and its bearing is shown as embodying a feed screw 17 which is threaded through an opening in the runner and has its opposite extremities provided with journals 18 which are received in bearings 19 at the extremities of the arms 20 of a bearing frame, 21 designating the base or connecting portion of said frame. At one end of the feed screw 17, one of the journals is extended beyond the bearing 19 and provided with means for rotating said screw, said means being shown in the form of a wheel 22 which may be turned by any suitable means. In order to prevent the runner 15 from revolving, the end of the runner is formed with a slot 23 loosely fitting upon a guide rail 24 shown as terminally supported by the arms 20 of the bearing frame.

The connecting or base portion 21 of the bearing frame is preferably of disk shape as indicated in Fig. 1 and is connected by a pivot 25 to a support 26 of any desired construction, the pivot 25 permitting the bearing frame to be oscillated slightly but to a sufficient extent to swing the transmission shaft 10 for the purpose of moving the pinions 11 and 13 into and out of engagement with the working faces of the driving and driven members 1 and 2. The means for oscillating said frame is illustrated as embodying a threaded rod 27 passing through a threaded opening in a support or arm 28 extending from the bearing 8. The rod 27 is operated by means of an arm or crank 29 at one end, the opposite end of the rod 27 having a swiveled connection at 30 with a short arm 31 on the bearing frame as shown in Fig. 2.

The operation of the mechanism hereinabove described is as follows: The driving member 1 to which motion may be imparted by any suitable means such as the shaft 5, turns the pinion 11 and thereby the shaft 10 and in turn the pinion 13 drives the driven member 2 which may be connected to the shaft 7, the latter leading off to any suitable mechanism to be driven. In order to change the relative speeds of the driving and driven members, the runner 15 and bearing 16 are shifted in the direction of length of the feed screw 17 by a rotative movement of the latter. During this operation, the shaft 10 is moved in the direction of its length by contact between one of the pinions and the driving or driven member in which it operates, the shaft 10 being thus crowded in one direction or the other in accordance with the direction in which the bearing 16 is moving. Of course, when the pinions are not in driving engagement with the working faces of the driving and driven members, all driving connection is broken between said driving and driven members thus permitting the driven member to come to a stop.

The mechanism hereinabove described is applicable to machinery in general and particularly where it is desirable or necessary to change the ratio of speed between two shafts.

What I claim is:—

1. In transmission gearing, a driving member having an internal cone-shaped working face, a driven member also having an internal cone-shaped working face, a transmission shaft carrying pinions operable in contact with the working faces of said driving and driven members, and means for shifting said transmission shaft to cause each of said pinions to engage portions of the working face of the respective driving or driven member of different diameters to thereby vary the relative speeds of the driving and driven members.

2. In transmission gearing, a driving member having an internal cone-shaped working face, a driven member also having an internal cone-shaped working face, a transmission shaft carrying pinions having cone-shaped working faces operable in contact with the working faces of said driving and driven members, and means for shifting said transmission shaft to cause each of said pinions to engage portions of the working face of the respective driving or driven member of different diameters to thereby vary the relative speeds of the driving and driven members.

3. In transmission gearing, a driving member having an internal beveled working face, a driven member also having an internal beveled working face, a transmission shaft carrying pinions operable in contact with the working faces of said driving and driven members, and means for shifting said transmission shaft to cause each of said pinions to engage portions of the working face of the respective driving or driven member of different diameters to thereby vary the relative speeds of the driving and driven members.

4. In transmission gearing, a driving member having an internal beveled working face, a driven member also having an internal beveled working face, a transmission shaft carrying pinions having beveled working faces operable in contact with the working faces of said driving and driven members, and means for shifting said transmission shaft to cause each of said pinions to engage portions of the working face of the respective driving or driven member of different diameters to thereby vary the relative speeds of the driving and driven members.

5. In transmission gearing, a driving member having an internal cone-shaped working face, a driven member also having an internal cone-shaped working face, a transmission shaft carrying pinions operable in contact with the working faces of said driving and driven members, and means for shifting said transmission shaft to cause each of said pinions to engage portions of the working face of the respective driving or driven member of different diameters to thereby vary the relative speeds of the driving and driven members, said means including a non-rotatable runner in which said shaft has a bearing.

6. In transmission gearing, a driving member having an internal cone-shaped working face, a driven member also having an internal cone-shaped working face, a transmission shaft carrying pinions operable in contact with the working faces of said driving and driven members, and means for shifting said transmission shaft to cause each of said pinions to engage portions of the working face of the respective driving or driven member of different diameters to thereby vary the relative speeds of the driving and driven members, said means including a non-rotatable runner in which said shaft has a bearing, and a feed screw coöperating with said runner to advance and retract the latter.

7. In transmission gearing, a driving member having an internal cone-shaped working face, a driven member also having an internal cone-shaped working face, a transmission shaft carrying pinions operable in contact with the working faces of said driving and driven members, means for shifting said transmission shaft to cause each of said pinions to engage portions of the working face of the respective driving or driven member of different diameters to thereby vary the relative speeds of the driving and driven members, and means for throwing said pinions out of engagement with the driving and driven members.

8. In transmission gearing, a driving member having an internal cone-shaped working face, a driven member also having an internal cone-shaped working face, a transmission shaft carrying pinions operable in contact with the working faces of said driving and driven members, means for shifting said transmission shaft to cause each of said pinions to engage portions of the working face of the respective driving or driven member of different diameters to thereby vary the relative speeds of the driving and driven members, and means for breaking the driving connection between said driving and driven members.

9. In transmission gearing, a driving member having an internal cone-shaped working face, a driven member also having an internal cone-shaped working face, a transmission shaft carrying pinions operable in contact with the working faces of said driving and driven members, means for shifting said transmission shaft to cause each of said pinions to engage portions of the working face of the respective driving or driven member of different diameters to thereby vary the relative speeds of the driving and driven members, said means including a non-rotatable runner in which said shaft has a bearing, and means for oscillating said runner to make and break contact between said pinions and the driving and driven members.

In testimony whereof I affix my signature in presence of two witnesses.

CLARENCE W. O'DONNELL.

Witnesses:
H. N. PEDERSEN,
N. C. PEDERSEN.

Copies of this patent may be obtained for five cents each, by addressing the "Commissioner of Patents, Washington, D. C."